(12) United States Patent
Ohashi

(10) Patent No.: US 10,069,172 B2
(45) Date of Patent: Sep. 4, 2018

(54) SPIRALLY-WOUND ELECTRODE AND METHOD OF MANUFACTURING SPIRALLY-WOUND ELECTRODE

(71) Applicant: Toyota Jidosha Kabushiki Kaisha, Toyota-shi Aichi-ken (JP)

(72) Inventor: Fuminori Ohashi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 164 days.

(21) Appl. No.: 15/363,466

(22) Filed: Nov. 29, 2016

(65) Prior Publication Data

US 2017/0162913 A1 Jun. 8, 2017

(30) Foreign Application Priority Data

Dec. 2, 2015 (JP) ................................. 2015-235707

(51) Int. Cl.
*H01M 10/05* (2010.01)
*H01M 4/13* (2010.01)
*H01M 2/16* (2006.01)
*H01M 10/42* (2006.01)
*H01M 10/04* (2006.01)
*H01M 10/0587* (2010.01)
(Continued)

(52) U.S. Cl.
CPC ..... *H01M 10/0587* (2013.01); *H01M 2/1686* (2013.01); *H01M 4/131* (2013.01); *H01M 4/133* (2013.01); *H01M 10/0431* (2013.01); *H01M 10/0525* (2013.01); *H01M 10/4235* (2013.01); *H01M 2/1646* (2013.01); *H01M 2/1653* (2013.01); *H01M 10/0409* (2013.01); *H01M 10/0468* (2013.01)

(58) Field of Classification Search
CPC .................................................. H01M 10/0587
See application file for complete search history.

(56) References Cited

U.S. PATENT DOCUMENTS 4,707,421 A * 11/1987 McVeigh, Jr. .......... H01M 2/26
429/164
5,965,290 A * 10/1999 Shimizu .................. H01M 2/14
429/211
(Continued)

FOREIGN PATENT DOCUMENTS

JP H05082122 A 4/1993
JP H09180761 A 7/1997
(Continued)

*Primary Examiner* — Matthew J Merkling
(74) *Attorney, Agent, or Firm* — Dinsmore & Shohl LLP

(57) ABSTRACT

In a spirally-wound electrode, in a first region, short sides of first and second separator sheets on an inner side are aligned with each other. In a second region, a negative electrode sheet, the first separator sheet, a positive electrode sheet, and the second separator sheet are arranged from an inner side toward an outer side in a radial direction. The second region extends from a position where short sides of the negative and positive electrode sheets on the inner side are aligned with each other in a same phase to a short side of the positive electrode sheet on an outer side. In a third region, the negative electrode sheet, and the first and second separator sheets are arranged from the inner side toward the outer side in the radial direction. The third region extends to a short side of the negative electrode sheet on the outer side.

5 Claims, 18 Drawing Sheets

(51) Int. Cl.
*H01M 4/131* (2010.01)
*H01M 4/133* (2010.01)
*H01M 10/0525* (2010.01)

(56) References Cited

U.S. PATENT DOCUMENTS

| | | | | |
|---|---|---|---|---|
| 6,391,488 B1 * | 5/2002 | Shimizu | ................ | H01M 2/023 429/126 |
| 6,951,576 B1 * | 10/2005 | Takeuchi | .............. | H01M 4/382 29/623.1 |
| 9,142,854 B2 * | 9/2015 | Lee | ..................... | H01M 2/1673 |
| 2006/0051662 A1 * | 3/2006 | Kwak | ............... | H01M 10/0431 429/142 |
| 2008/0233474 A1 | 9/2008 | Son et al. | | |
| 2009/0297929 A1 * | 12/2009 | Uchida | ............. | H01M 10/0431 429/94 |
| 2009/0311607 A1 * | 12/2009 | Han | ........................ | H01M 2/04 429/246 |
| 2015/0111078 A1 * | 4/2015 | Hosoya | ............. | H01M 10/0587 429/94 |

FOREIGN PATENT DOCUMENTS

| | | |
|---|---|---|
| JP | H09231986 A | 9/1997 |
| JP | H11273708 A | 10/1999 |
| JP | 2010-192325 A | 9/2010 |
| JP | 2012-022813 A | 2/2012 |
| JP | 2012-230865 A | 11/2012 |
| JP | 2013-004195 A | 1/2013 |
| JP | 2013-089441 A | 5/2013 |
| JP | 2015-207444 A | 11/2015 |

* cited by examiner

SPIRALLY-WOUND ELECTRODE AND METHOD OF MANUFACTURING SPIRALLY-WOUND ELECTRODE

CROSS-REFERENCE TO RELATED APPLICATIONS

This application claims priority to Japanese Patent Application No. 2015-235707 filed on Dec. 2, 2015, the entire contents of which are hereby incorporated by reference.

BACKGROUND

1. Technical Field

The disclosure relates to a spirally-wound electrode used in a lithium-ion secondary battery or the like, and a method of manufacturing the spirally-wound electrode.

2. Description of Related Art

A lithium-ion secondary battery or the like may include a spirally-wound electrode in which a positive electrode sheet, a negative electrode sheet, and a separator sheet are stacked and formed to have a spiral shape. As the spirally-wound electrode, Japanese Patent Application Publication No. 2010-192325 (JP 2010-192325 A) describes an electrode manufactured by stacking a positive electrode, a separator, a negative electrode, and a separator in a stated order from an inner side of a winding shaft, and winding them with the use of the winding shaft.

SUMMARY

In the spirally-wound electrode, it is generally required that the negative electrode sheet should be further provided on an inner side relative to an innermost peripheral part of the positive electrode sheet so that innermost peripheral parts of the positive electrode sheet do not face each other. The reason is as follows. In a case where the innermost peripheral parts of the positive electrode sheet face each other, no negative electrode sheet is disposed on an inner peripheral side relative to the innermost peripheral parts of the positive electrode sheet, and therefore, lithium precipitates on an inner-peripheral-side surface of the positive electrode sheet, for example. This may make it difficult to maintain performance of the spirally-wound electrode.

Further, in the spirally-wound electrode, in order to restrain exposure of the electrode sheets to the outside so as to maintain the performance of the spirally-wound electrode, it is desirable that two separators should be stacked consecutively on a further outer peripheral side relative to an outermost peripheral part (a part disposed on an outermost peripheral side in a radial direction of a spiral) of the negative electrode sheet.

In view of this, in the conventional spirally-wound electrode, like the electrode of JP 2010-192325 A, which is manufactured by stacking a positive electrode, a separator sheet, a negative electrode, and a separator sheet in a stated order from an inner side of a winding shaft and winding them with the use of the winding shaft, the separator sheet is made long in order to maintain the performance of the spirally-wound electrode as described above.

The reason is as follows. FIG. 19 illustrates a stacked body 200 in which sheets of the conventional spirally-wound electrode are unfolded in a belt shape. As illustrated in FIG. 19, the stacked body 200 is configured such that a positive electrode sheet 220, a first separator sheet 240, a negative electrode sheet 230, and a second separator sheet 250 are disposed in a stated order from an upper side in the figure. The stacked body 200 includes a first region 201, a second region 202, a third region 203, a fourth region 204, and a fifth region 205, as regions having different arrangements of sheets. Note that the second region 202 is a region provided so as to dispose the negative electrode sheet 230 on an inner side relative to an innermost peripheral part of the positive electrode sheet 220.

As a result, in the third region 203, only the second separator sheet 250 is disposed on a lower side (corresponding to an outer peripheral side of the spirally-wound electrode) in the figure relative to the negative electrode sheet 230. In the third region 203, a region close to the fourth region 204 is a region constituting an outermost peripheral part of the negative electrode sheet in the spirally-wound electrode. Accordingly, in order to consecutively stack the two separator sheets on a further outer peripheral side relative to the outermost peripheral part of the negative electrode sheet, it is necessary to lengthen the first separator sheet 240 so that the first separator sheet 240 is disposed on the second separator sheet 250. Accordingly, it is necessary to provide the fifth region 205 constituted by the first separator sheet 240. As a result, the separator sheet is made long. Further, it is necessary to cut the two separator sheets at different positions.

The disclosure provides a spirally-wound electrode that makes it possible to shorten separator sheets while maintaining performance of the spirally-wound electrode, and a method of manufacturing the spirally-wound electrode.

A first aspect of the disclosure relates to a spirally-wound electrode including a sheet group in which a negative electrode sheet, a first separator sheet, a positive electrode sheet, and a second separator sheet are arranged, the sheet group being in a shape of a spiral. Each of the negative electrode sheet, the first separator sheet, the positive electrode sheet, and the second separator sheet has a rectangular shape, and a long-side direction of each of the negative electrode sheet, the first separator sheet, the positive electrode sheet, and the second separator sheet extends along a circumferential direction of the spiral. A long side of the negative electrode sheet is longer than a long side of the positive electrode sheet, and a long side of the first separator sheet and a long side of the second separator sheet are longer than the long side of the negative electrode sheet. The spirally-wound electrode includes a first region, a second region, a third region, and a fourth region arranged in a stated order from a central side of the spiral in the circumferential direction of the spiral. The first region is a region where the first separator sheet makes direct contact with the second separator sheet and a position of a short side of the first separator sheet on an inner side of the spiral is aligned with a position of a short side of the second separator sheet on the inner side of the spiral. The second region is a region where the negative electrode sheet, the first separator sheet, the positive electrode sheet, and the second separator sheet are arranged in a stated order from an inner side toward an outer side in a radial direction of the spiral, and the second region extends, in the circumferential direction of the spiral, from a position where a short side of the negative electrode sheet on the inner side of the spiral and a short side of the positive electrode sheet on the inner side of the spiral are aligned with each other in a same phase to a position of a short side of the positive electrode sheet on an outer side of the spiral. The third region is a region where the negative electrode sheet, the first separator sheet, and the second separator sheet are arranged in a stated order from the inner side toward the outer side in the radial direction of the spiral, and the third region extends, in the circumferential direction of the spiral, from the position of the short side of the positive electrode sheet on the outer side of the spiral to a position of a short side of the negative electrode sheet on the outer side of the spiral. The fourth region is a region where the first separator sheet makes direct contact with the second separator sheet.

According to the first aspect, in the third region, the first separator sheet and the second separator sheet are disposed on a further outer peripheral side relative to an outermost peripheral part (a part disposed on an outermost side in the radial direction of the spiral) of the negative electrode sheet. Accordingly, unlike a conventional electrode, it is not necessary to lengthen one of the two separator sheets, thereby making it possible to shorten the separator sheets. Further, the position of the short side of the first separator sheet on the inner side of the spiral is aligned with the position of the short side of the second separator sheet on the inner side of the spiral. With this configuration, the lengths of the first separator sheet and the second separator sheet can be made uniform, and thus, the separator sheets can be shortened more reliably.

Further, the two separator sheets are consecutively stacked on the further outer peripheral side relative to the outermost peripheral part of the negative electrode sheet, thereby making it possible to restrain the negative electrode sheet from being exposed to the outside. This makes it possible to maintain performance of the electrode.

Further, in the second region, the negative electrode sheet is disposed on the inner peripheral side relative to the positive electrode sheet. Further, the short side of the negative electrode sheet on the inner side of the spiral and the short side of the positive electrode sheet on the inner side of the spiral are aligned at the positions in the same phase in the circumferential direction of the spiral. Accordingly, the negative electrode sheet is further disposed on the inner peripheral side relative to an innermost peripheral part (a part disposed on an innermost side in the radial direction of the spiral) of the positive electrode sheet. Therefore, it is possible to avoid a situation where inner peripheral sides of innermost peripheral parts of the positive electrode sheet face each other. Accordingly, it is possible to prevent lithium from precipitating on a surface of the positive electrode sheet on the inner peripheral side, thereby making it possible to maintain performance of the electrode.

In the above-described aspect, in the fourth region, the first separator sheet and the second separator sheet may be arranged in a stated order from the inner side toward the outer side in the radial direction of the spiral; and in the fourth region, a short side of the first separator sheet on the outer side of the spiral and a short side of the second separator sheet on the outer side of the spiral may be aligned at positions in a same phase.

With the above-described configuration, the lengths of the first separator sheet and the second separator sheet can be made uniform, and thus, the first separator sheet and the second separator sheet can be shortened more reliably.

In the above-described aspect, in the fourth region, the first separator sheet and the second separator sheet may be arranged in a stated order from the inner side toward the outer side in the radial direction of the spiral; in the fourth region, a short side of the first separator sheet on the outer side of the spiral may be disposed at a position in a phase displaced toward a side opposite to the central side of the spiral relative to a short side of the second separator sheet on the outer side of the spiral, in the circumferential direction of the spiral; and the short side of the first separator sheet on the outer side of the spiral, the short side of the second separator sheet on the outer side of the spiral, and the second separator sheet in the third region may be fastened by an adhesive tape.

With the above-described configuration, even if charging and discharging is repeated in a battery including the spirally-wound electrode and the spirally-wound electrode expands and shrinks, the first separator sheet and the second separator sheet can hardly expand and shrink, and thus, it is possible to maintain quality of the battery.

In the above-described aspect, in the second region, a heat resistance layer of the first separator sheet may face a heat resistance layer of the second separator sheet such that the positive electrode sheet is disposed between the heat resistance layer of the first separator sheet and the heat resistance layer of the second separator sheet.

With the above-described configuration, in case of overcharge of the battery including the spirally-wound electrode, heat generated by the positive electrode sheet can be thermally insulated.

A second aspect of the disclosure relates to a method of manufacturing a spirally-wound electrode including a sheet group in which a negative electrode sheet, a first separator sheet, a positive electrode sheet, and a second separator sheet are arranged, the sheet group being in a shape of a spiral, wherein each of the negative electrode sheet, the first separator sheet, the positive electrode sheet, and the second separator sheet has a rectangular shape, and a long-side direction of each of the negative electrode sheet, the first separator sheet, the positive electrode sheet, and the second separator sheet extends along a circumferential direction of the spiral. The method includes a first winding step of circumferentially winding the first separator sheet and the second separator sheet with the first separator sheet making direct contact with the second separator sheet; a second winding step of, after the first winding step, circumferentially winding the negative electrode sheet, the first separator sheet, the positive electrode sheet, and the second separator sheet by inserting the negative electrode sheet on a winding center side relative to the first separator sheet and inserting the positive electrode sheet between the first separator sheet and the second separator sheet such that the positive electrode sheet is on a side opposite to the winding center side relative to the first separator sheet; a third winding step of, after the second winding step, circumferentially winding the negative electrode sheet, the first separator sheet, and the second separator sheet in a state where the negative electrode sheet, the first separator sheet, and the second separator sheet are arranged in a stated order from the winding center side; and a fourth winding step of, after the third winding step, circumferentially winding the first separator sheet and the second separator sheet with the first separator sheet making direct contact with the second separator sheet. A long side of the negative electrode sheet is longer than a long side of the positive electrode sheet, and a long side of the first separator sheet and a long side of the second separator sheet are longer than the long side of the negative electrode sheet. In the first winding step, a position of a short side of the first separator sheet on a winding start side is aligned with a position of a short side of the second separator sheet on the winding start side. In the second winding step, a short side of the negative electrode sheet on the winding start side and a short side of the positive electrode sheet on the winding start side are aligned at positions in a same phase in a winding direction, and a short side of the positive electrode sheet on a winding end side is wound up. In the third winding step, a short side of the negative electrode sheet on the winding end side is wound up.

According to the second aspect, in the third winding step, the first separator sheet and the second separator sheet are disposed on the further outer peripheral side relative to the outermost peripheral part of the negative electrode sheet. Accordingly, unlike the conventional spirally-wound electrode, it is not necessary to lengthen one of two separator sheets, thereby making it possible to shorten the separator sheets. Further, in the first winding step, the position of the short side of the first separator sheet on the winding start side is aligned with the position of the short side of the second separator sheet on the winding start side. With this configuration, the lengths of the first separator sheet and the second separator sheet can be made uniform, and thus, the separator sheets can be shortened more reliably.

Further, the two separator sheets are consecutively stacked on the further outer peripheral side relative to the outermost peripheral part of the negative electrode sheet, thereby making it possible to restrain the negative electrode sheet from being exposed to the outside. This makes it possible to maintain performance of the electrode.

Further, in the second winding step, the negative electrode sheet is disposed on the winding center side relative to the positive electrode sheet. Further, the short side of the negative electrode sheet on the winding start side and the short side of the positive electrode sheet on the winding start side are aligned at the positions in the same phase in the winding direction. Thus, the negative electrode sheet is further disposed on the inner peripheral side relative to the innermost peripheral part of the positive electrode sheet. Therefore, it is possible to avoid a situation where inner peripheral sides of the innermost peripheral parts of the positive electrode sheet face each other. Accordingly, for example, it is possible to prevent lithium from precipitating on a surface of the positive electrode sheet on the inner peripheral side. This makes it possible to maintain the performance of the electrode.

With the spirally-wound electrode and the method of manufacturing the spirally-wound electrode according to the above aspects of the disclosure, it is possible to shorten the separator sheets while maintaining the performance of the spirally-wound electrode.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Figure 1:
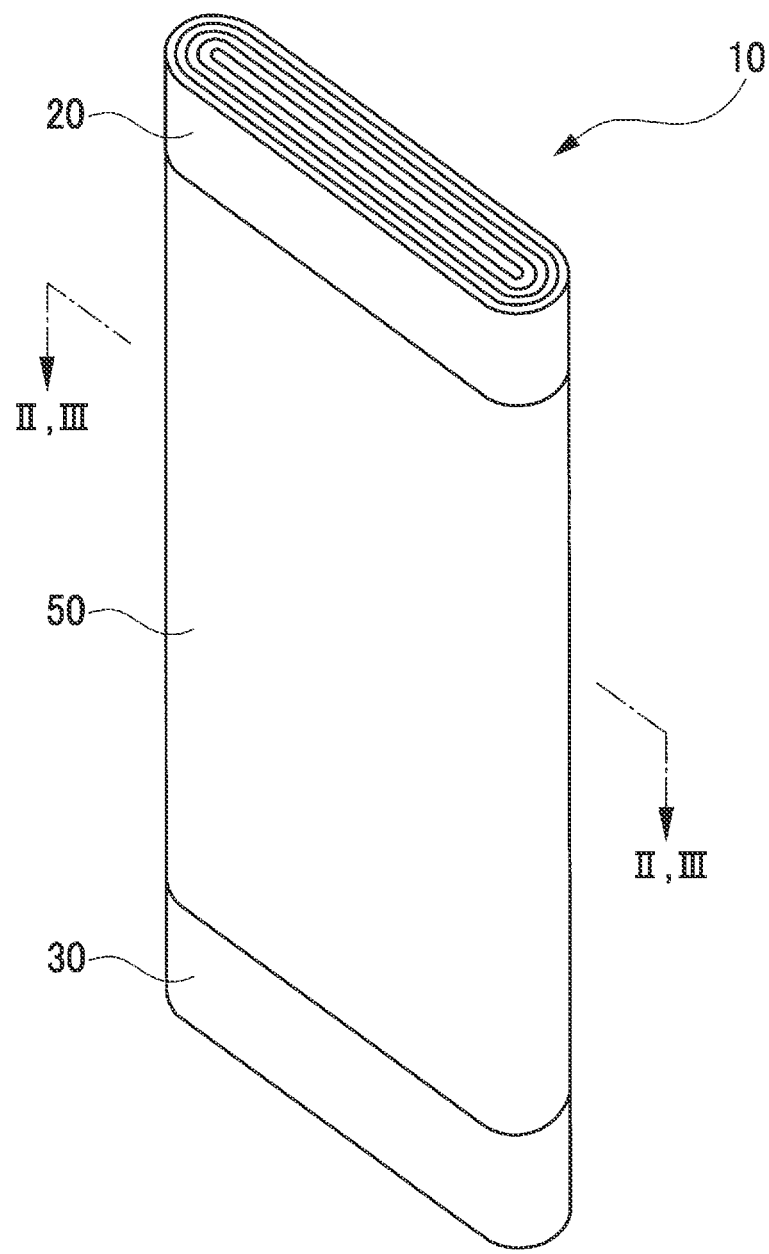
FIG. 1 is a perspective view of a spirally-wound electrode.
Figure 2:
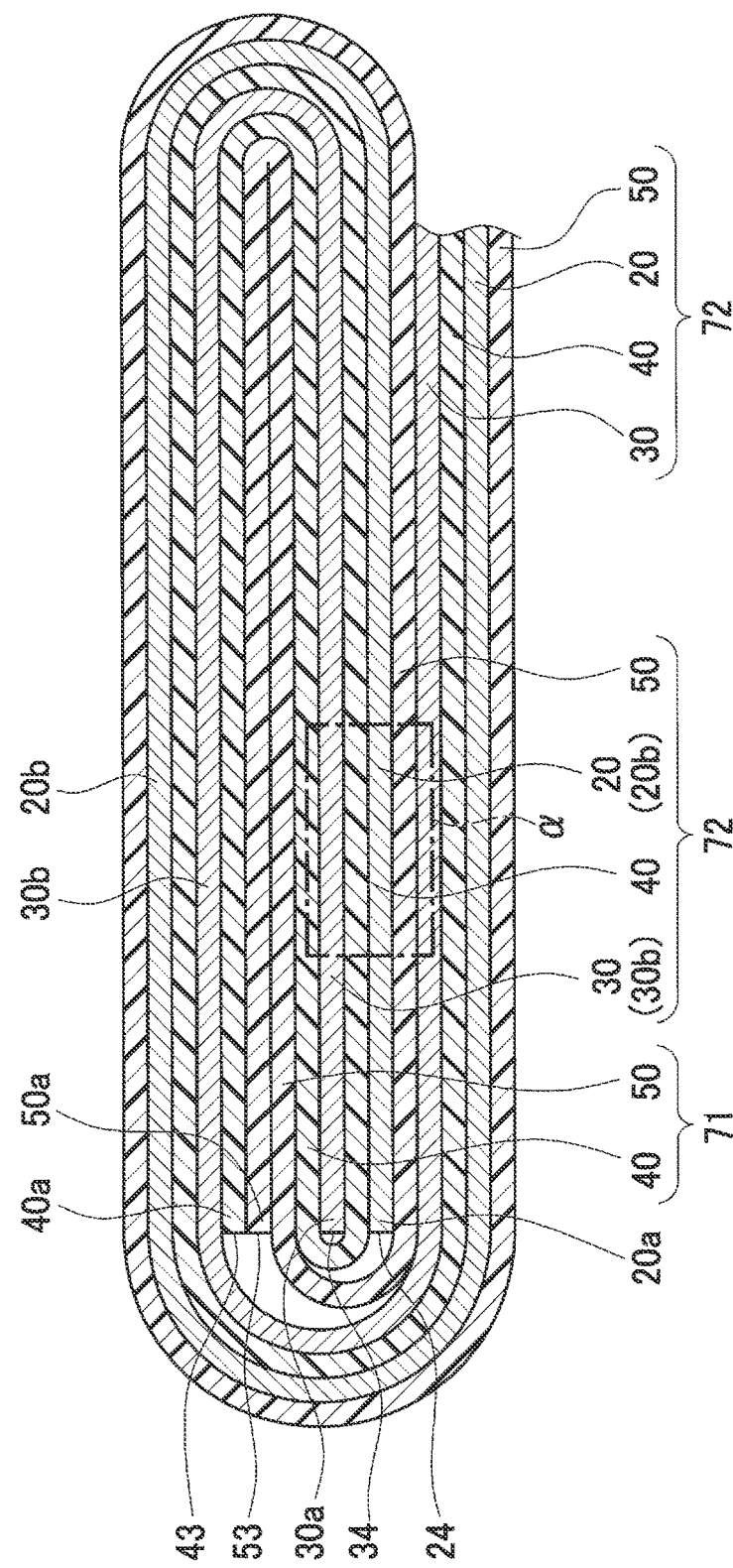
FIG. 2 is an enlarged view of an inner peripheral part of the spirally-wound electrode in a section taken along a line II,III-II,III in FIG. 1.
Figure 3:
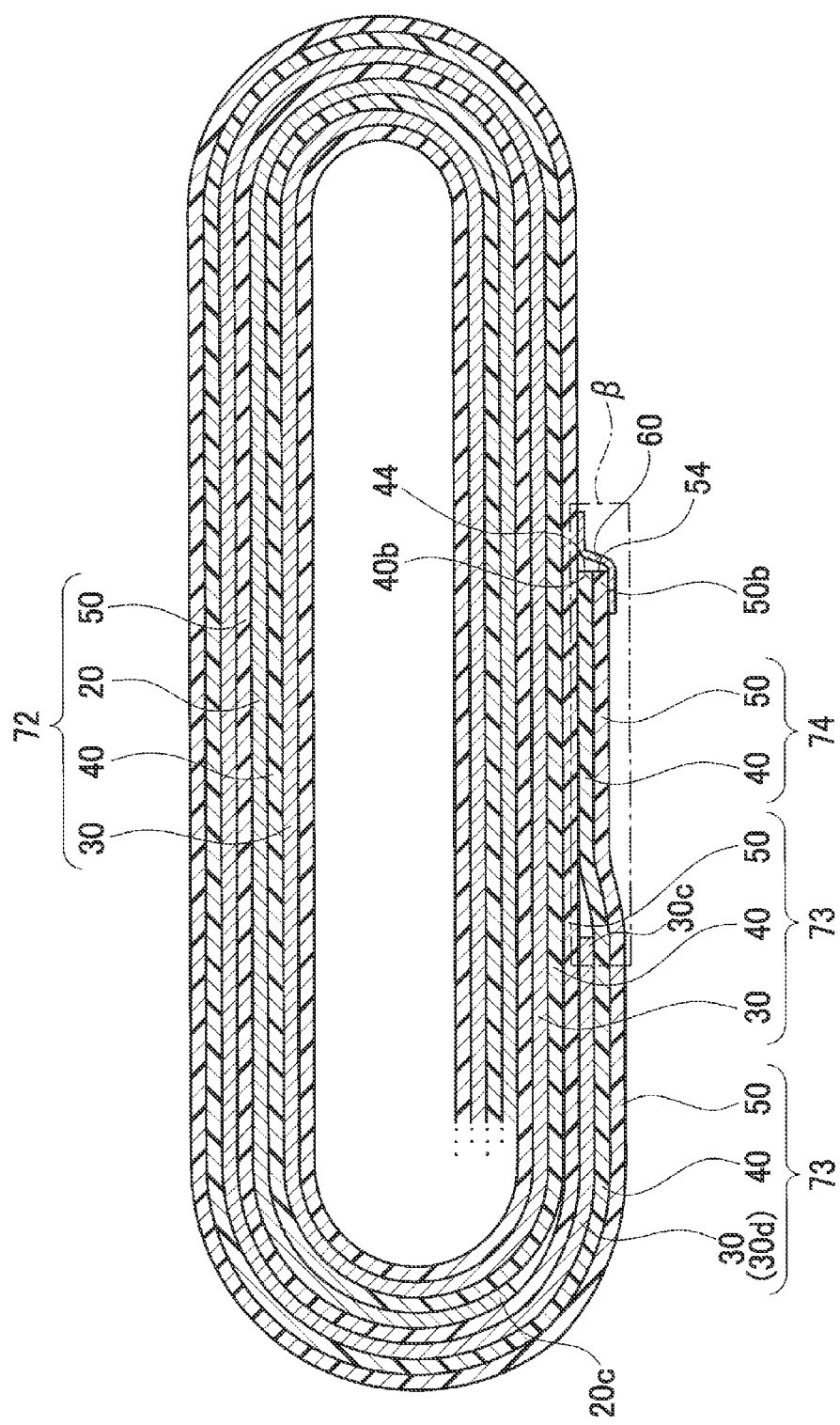
FIG. 3 is an enlarged view of an outer peripheral part of the spirally-wound electrode in the section taken along the line II,III-II,III in FIG. 1.

A configuration of a spirally-wound electrode 10 of some embodiments will be described. As illustrated in FIGS. 1 to 3, the spirally-wound electrode 10 includes a positive electrode sheet 20, a negative electrode sheet 30, a first separator sheet 40, and a second separator sheet 50. The spirally-wound electrode 10 is configured such that a sheet group in which the negative electrode sheet 30, the first separator sheet 40, the positive electrode sheet 20, and the second separator sheet 50 are arranged is formed in a shape of a spiral (i.e., a spiral shape).

Figure 8:
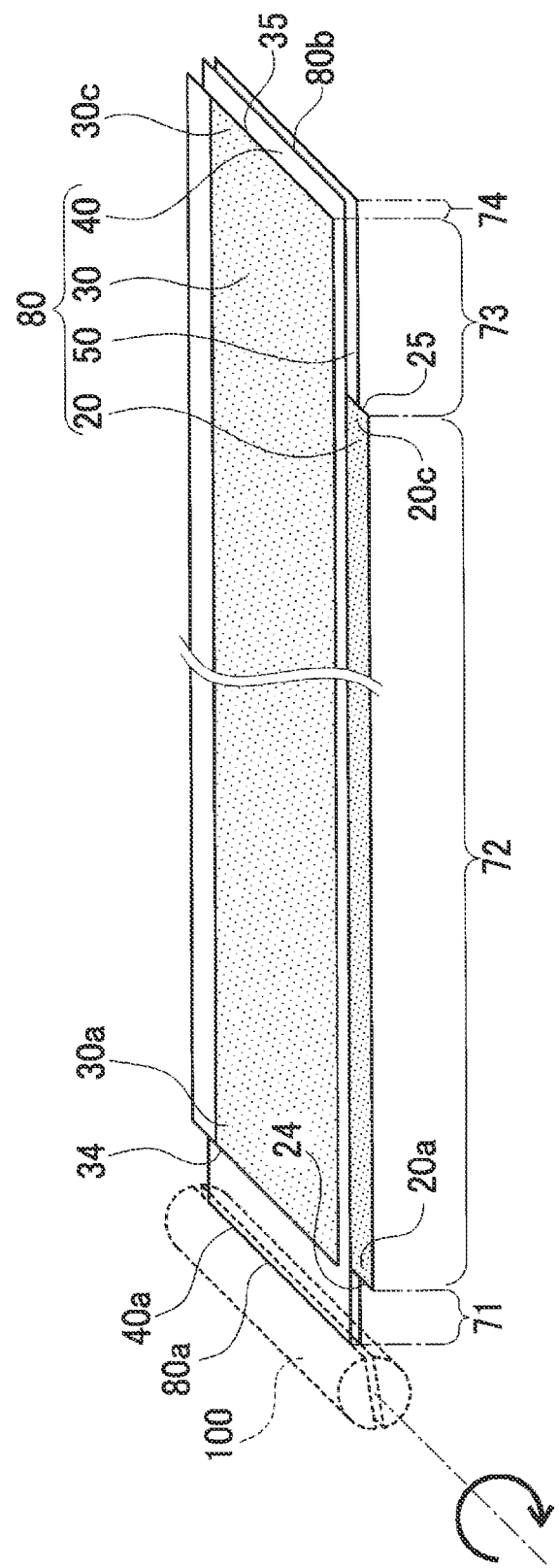
FIG. 8 is a perspective view of a stacked body, in which the spirally-wound electrode is unfolded in a belt shape.

Each of the positive electrode sheet 20, the negative electrode sheet 30, the first separator sheet 40, and the second separator sheet 50 has a rectangular shape (see FIG. 8). A long-side direction of each of the positive electrode sheet 20, the negative electrode sheet 30, the first separator sheet 40, and the second separator sheet 50 extends along a circumferential direction of the spiral. The negative electrode sheet 30 is longer than the positive electrode sheet 20 in the long-side direction. The first separator sheet 40 and the second separator sheet 50 have the same length in the long-side direction, and are longer than the negative electrode sheet 30 in the long-side direction.

In some embodiments, an outer shape of the spirally-wound electrode 10 is formed in a flat shape, and the positive electrode sheet 20, the negative electrode sheet 30, the first separator sheet 40, and the second separator sheet 50 are wound in a flat shape.

Figure 4:
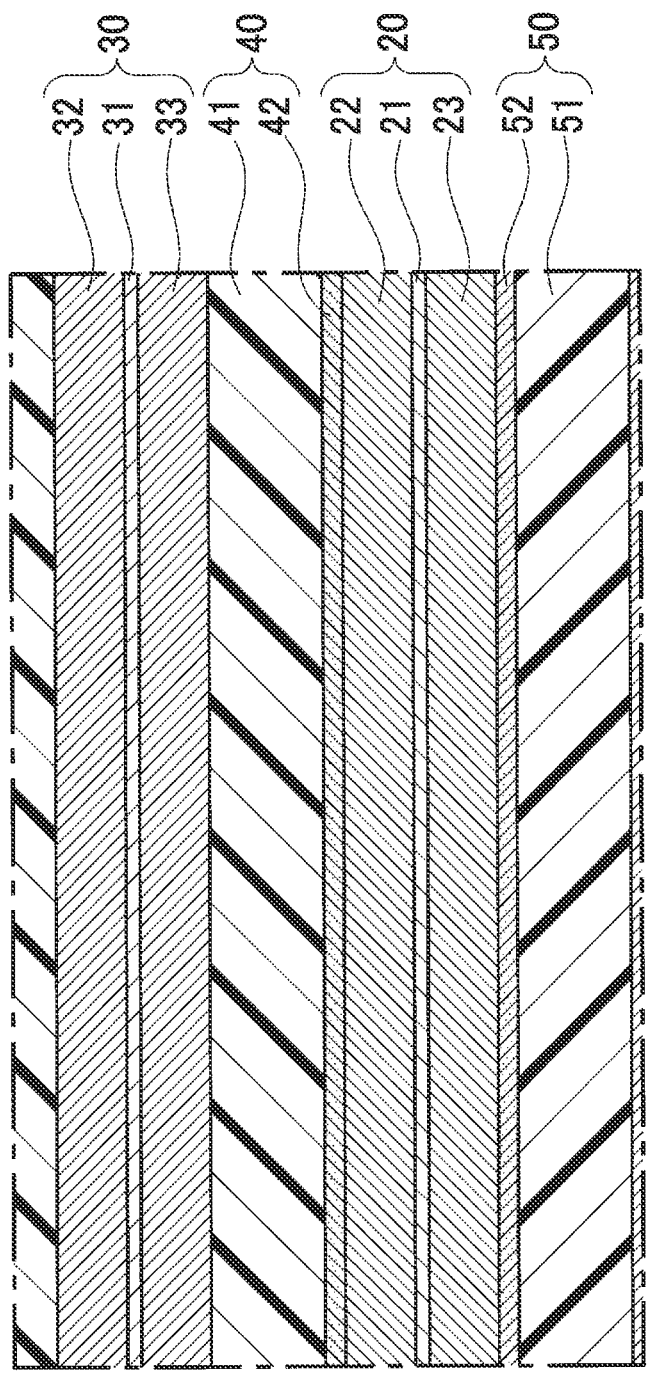
FIG. 4 is an enlarged view of a region α in FIG. 2.

As illustrated in FIG. 4, the positive electrode sheet 20 is formed by applying a mixture including a positive electrode active material, a conductive auxiliary agent, and a binder, to an aluminum foil 21 that is a positive electrode core material, so as to form a positive electrode active material layer 22 and a positive electrode active material layer 23 on both sides of the aluminum foil 21. The positive electrode active material can store/release lithium ions. The positive electrode active material is, for example, a lithium composite oxide such as a lithium nickel oxide ($LiNiO_2$), a lithium manganese oxide ($LiMnO_2$), or a lithium cobalt oxide ($LiCoO_2$).

As illustrated in FIG. 4, the negative electrode sheet 30 is formed by applying a mixture including a negative electrode active material, a conductive auxiliary agent, and a binder, to a copper foil 31 that is a negative electrode core material, so as to form a negative electrode active material layer 32 and a negative electrode active material layer 33 on both sides of the copper foil 31. The negative electrode active material can store/release lithium ions. The negative electrode active material is, for example, a carbon-based substance such as amorphous carbon, non-graphitizable carbon, graphitizable carbon, or graphite.

As illustrated in FIG. 4, the first separator sheet 40 includes a resin layer 41 and a heat resistance layer 42. The resin layer 41 is, for example, a porous film such as polyethylene or polypropylene. The heat resistance layer 42 is, for example, a powdery layer including metal oxide, and the like. Note that the heat resistance layer 42 is called HRL (Heat Resistance Layer), and has an effect of preventing overheating of a battery.

As illustrated in FIG. 4, the second separator sheet 50 includes a resin layer 51 and a heat resistance layer 52. The resin layer 51 is, for example, a porous film such as polyethylene or polypropylene. The heat resistance layer 52 is, for example, a powdery layer including metal oxide, and the like. Note that the heat resistance layer 52 is called HRL (Heat Resistance Layer), and has an effect of preventing overheating of a battery.

In some embodiments, as illustrated in FIG. 4, in a second region 72, the heat resistance layer 42 of the first separator sheet 40 faces the heat resistance layer 52 of the second separator sheet 50 via the positive electrode sheet 20 (such that the positive electrode sheet 20 is disposed between the heat resistance layer 42 and the heat resistance layer 52). Thus, in case of overcharge of a battery including the spirally-wound electrode 10, heat generated by the positive electrode sheet 20 can be thermally insulated.

Figure 5:
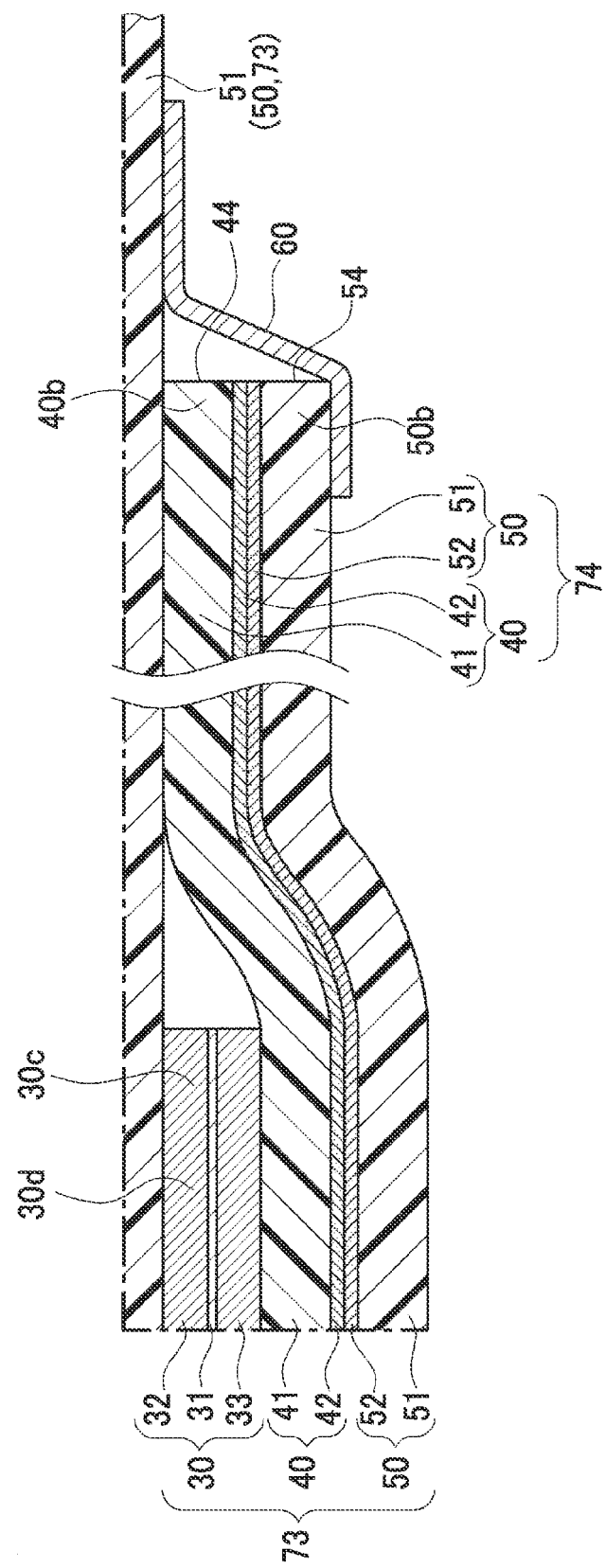
FIG. 5 is an enlarged view of a region β in FIG. 3.

Further, as illustrated in FIG. 3, in a third region 73, a trailing end 30c of the negative electrode sheet 30 is covered with a pair of separator sheets formed of the first separator sheet 40 and the second separator sheet 50, from an outer peripheral side. As illustrated in FIG. 5, in the third region 73 and a fourth region 74, the heat resistance layer 42 of the first separator sheet 40 faces the heat resistance layer 52 of the second separator sheet 50 such that the heat resistance layer 42 and the heat resistance layer 52 make direct contact with each other. In this case, the second separator sheet 50 includes the resin layer 51 on the outer peripheral side, so the second separator sheet 50 can hardly bend toward an inner peripheral side, and can easily bend toward the outer peripheral side. In the meantime, since the first separator sheet 40 includes the resin layer 41 on the inner peripheral side, the first separator sheet 40 can easily bend toward the inner peripheral side, and can hardly bend toward the outer peripheral side. Accordingly, even if the second separator sheet 50 is rolled up toward the outer peripheral side, the first separator sheet 40 can be hardly rolled up toward the outer peripheral side. Accordingly, even if the second separator sheet 50 is rolled up toward the outer peripheral side, the trailing end 30c of the negative electrode sheet 30 is maintained in a state in which the trailing end 30c is covered with the first separator sheet 40, so the trailing end 30c can be hardly exposed.

Figure 6:
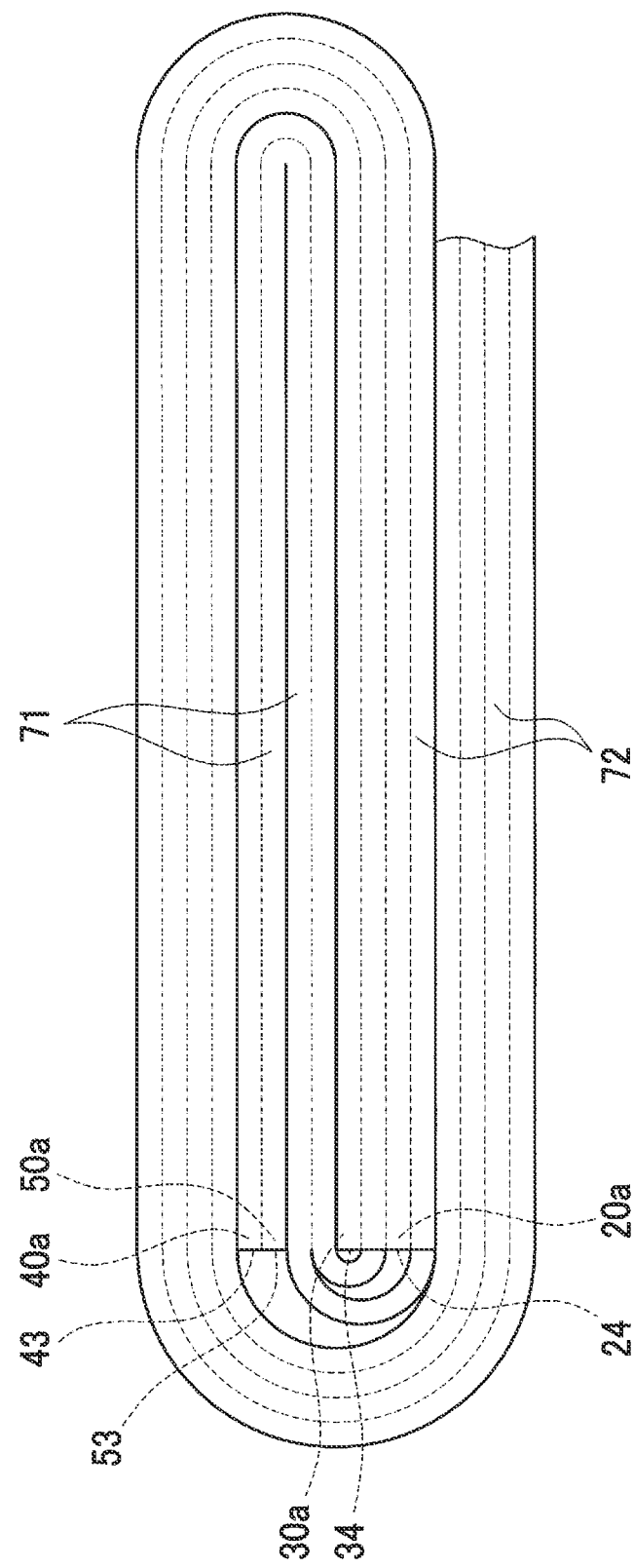
FIG. 6 is a drawing corresponding to FIG. 2 and is an image view illustrating an arrangement of a first region and a second region.
Figure 7:
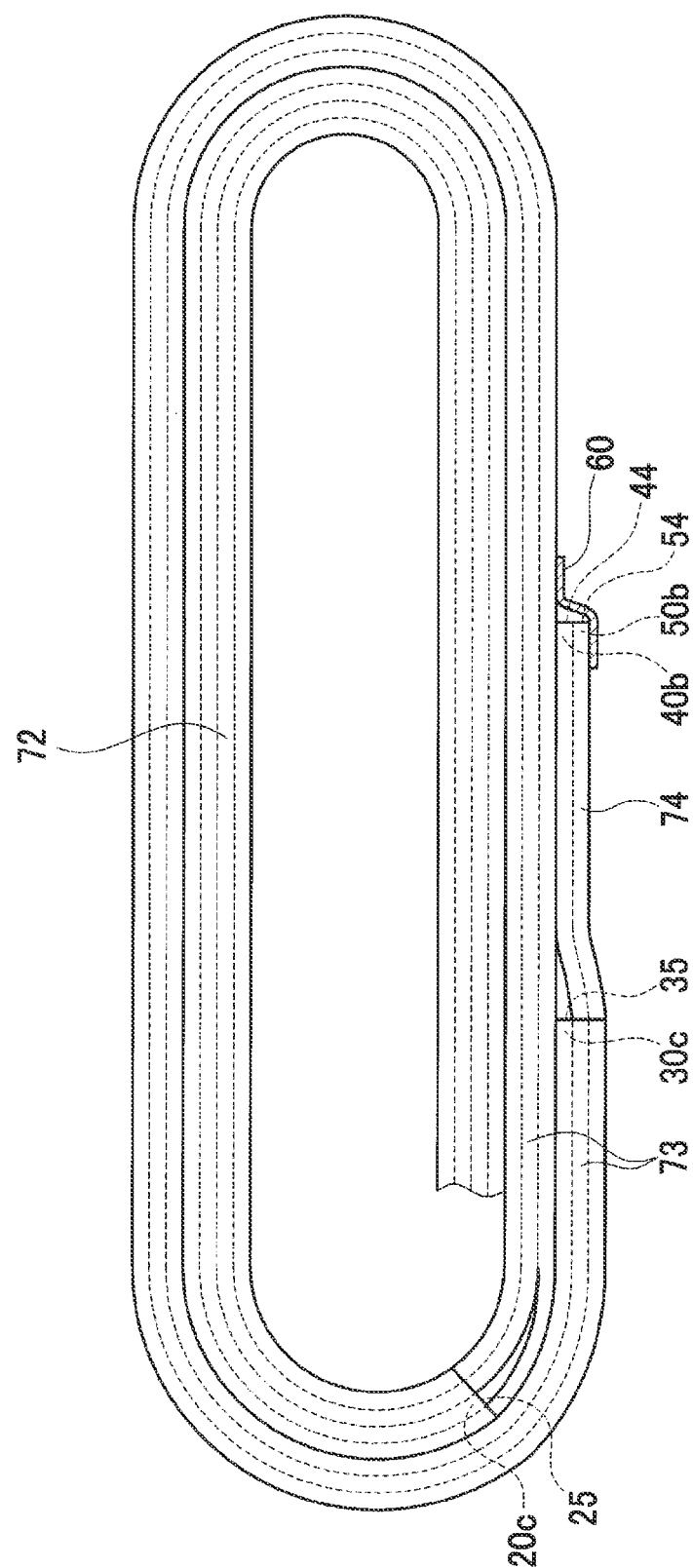
FIG. 7 is a drawing corresponding to FIG. 3 and is an image view illustrating an arrangement of a second region, a third region, and a fourth region.

As illustrated in FIGS. 6, 7, the spirally-wound electrode 10 of some embodiments includes a first region 71, the second region 72, the third region 73, and the fourth region 74 arranged in the stated order from a central side of the spiral in a circumferential direction of the spiral (the spiral shape). The first region 71, the second region 72, the third region 73, and the fourth region 74 are regions having different sheet arrangements.

As illustrated in FIG. 2, in the first region 71, the first separator sheet 40 makes direct contact with the second separator sheet 50. That is, in the first region 71, a sheet including the first separator sheet 40 and the second separator sheet 50 in combination is disposed, and the positive electrode sheet 20 and the negative electrode sheet 30 are not disposed.

Further, in the first region 71, a position of a short side 43 of the first separator sheet 40 on a starting end 40a-side (an inner side of the spiral) is aligned with a position of a short side 53 of the second separator sheet 50 on a starting end 50a-side (the inner side of the spiral). Note that, in the following description, an end portion (one end of each sheet in the long-side direction, i.e., an end portion at a winding start side of the sheet) on the inner side of the spiral is referred to as a "starting end," appropriately, and an end portion (the other end of each sheet in the long-side direction, i.e., an end portion at a winding end side of the sheet) on an outer side of the spiral is referred to as a "trailing end," appropriately.

As illustrated in FIGS. 2, 3, in the second region 72, the negative electrode sheet 30, the first separator sheet 40, the positive electrode sheet 20, and the second separator sheet 50 are arranged in the stated order from the inner side toward the outer side in a radial direction of the spiral.

Further, the second region 72 extends, in the circumferential direction of the spiral, from a position where a short side 34 of the negative electrode sheet 30 on a starting end 30a-side (the inner side of the spiral) and a short side 24 of the positive electrode sheet 20 on a starting end 20a-side (the inner side of the spiral) are aligned with each other in the same phase, to a position of a short side 25 of the positive electrode sheet 20 on a trailing end 20c-side (the outer side of the spiral). Thus, in the second region 72, the short side 34 of the negative electrode sheet 30 on the starting end 30a-side and the short side 24 of the positive electrode sheet 20 on the starting end 20a-side are aligned at the positions in the same phase in the circumferential direction of the spiral.

The sheets of the spirally-wound electrode 10 of some embodiments are wound in a flat spiral shape having a linear part and a circular arc part. In view of this, in some embodiments, the "positions in the same phase (in the circumferential direction of the spiral)" indicates the positions that are the same in a linear direction in the linear part of the flat shape of the sheets, and also indicates the positions on the same straight line extended in a radial direction of a circular arc from a center of the circular arc in the circular arc part of the flat shape of the sheets.

Figure 9:
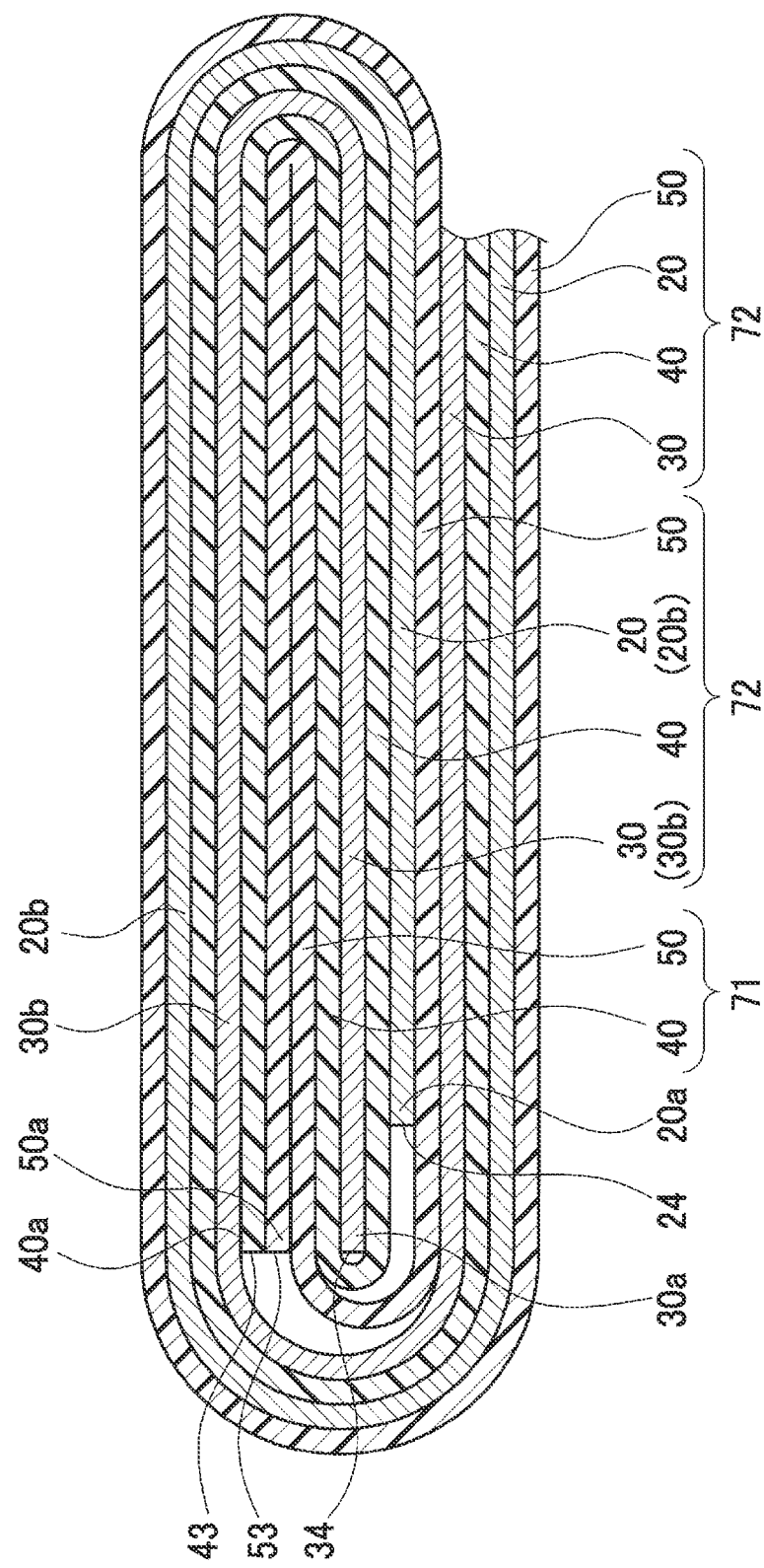
FIG. 9 is a drawing corresponding to FIG. 2 and is a view illustrating an example in which a position of a starting end of the negative electrode sheet is displaced from a position of a starting end of the positive electrode sheet.

Further, "the same phase" in some embodiments is not limited to precisely the same phase, and includes substantially the same phase including a deviation due to a difference in circumference length at the time when sheets with the same length are stacked and wound, and a deviation due to a manufacturing error. Accordingly, for example, as illustrated in FIG. 9, the short side 24 of the positive electrode sheet 20 on the starting end 20a-side may be disposed at a position displaced toward the trailing end 30c (a right side in FIG. 9) of the negative electrode sheet 30 relative to the short side 34 of the negative electrode sheet 30 on the starting end 30a-side, in the circumferential direction of the spiral. At this time, for example, a displacement amount between the short side 24 of the positive electrode sheet 20 on the starting end 20a-side and the short side 34 of the negative electrode sheet 30 on the starting end 30a-side may be set to the same amount as the amount of a difference between a length of the negative electrode sheet 30 in a short-side direction and a length of the positive electrode sheet 20 in the short-side direction, in a case where the length of the negative electrode sheet 30 in the short-side direction is made larger than the length of the positive electrode sheet 20 in the short-side direction.

As illustrated in FIG. 3, in the third region 73, the negative electrode sheet 30, the first separator sheet 40, and the second separator sheet 50 are arranged in the stated order from the inner side toward the outer side in the radial direction of the spiral.

Further, the third region 73 extends, in the circumferential direction of the spiral, from a position of the short side 25 of the positive electrode sheet 20 on the trailing end 20c-side to a position of the short side 35 of the negative electrode sheet 30 on the trailing end 30c-side (the outer side of the spiral).

In the third region 73, the negative electrode sheet 30 makes direct contact with the first separator sheet 40, the first separator sheet 40 makes direct contact with the second separator sheet 50, and the negative electrode sheet 30 makes direct contact with the second separator sheet 50. That is, in the third region 73, a sheet including the negative electrode sheet 30, the first separator sheet 40, and the second separator sheet 50 in combination is disposed, and the positive electrode sheet 20 is not disposed.

Note that the third region 73 is formed so as to dispose the negative electrode sheet 30 at a position on the outer peripheral side relative to an outermost peripheral part (i.e., a part disposed on an outermost side in the radial direction of the spiral) of the positive electrode sheet 20.

Further, as illustrated in FIG. 3, in the fourth region 74, the first separator sheet 40 makes direct contact with the second separator sheet 50. That is, in the fourth region 74, a sheet including the first separator sheet 40 and the second separator sheet 50 in combination is disposed, and the positive electrode sheet 20 and the negative electrode sheet 30 are not disposed.

In the spirally-wound electrode 10 of some embodiments as described above, a long side of the negative electrode sheet 30 is longer than a long side of the positive electrode sheet 20. Further, the second region 72 extends, in the circumferential direction of the spiral, from the position where the short side 34 of the negative electrode sheet 30 on the starting end 30a-side and the short side 24 of the positive electrode sheet 20 on the starting end 20a-side are aligned with each other in the same phase, to the position of the short side 25 of the positive electrode sheet 20 on the trailing end 20c-side. In the third region 73, the negative electrode sheet 30, the first separator sheet 40, and the second separator sheet 50 are arranged in the stated order from the inner side toward the outer side in the radial direction of the spiral. Further, the third region 73 extends, in the circumferential direction of the spiral, from the position of the short side 25 of the positive electrode sheet 20 on the trailing end 20c-side to the position of the short side 35 of the negative electrode sheet 30 on the trailing end 30c-side.

Figure 19:
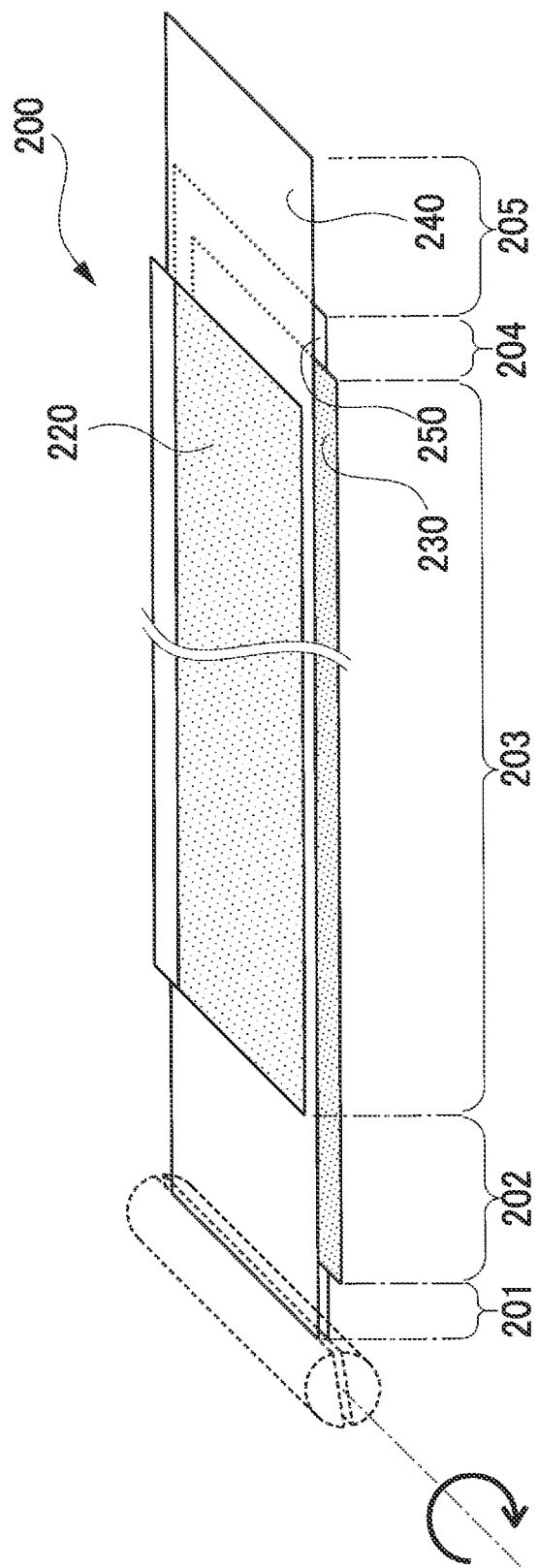
FIG. 19 is a perspective view of a stacked body, in which a conventional spirally-wound electrode is unfolded in a belt shape.

Thus, in the spirally-wound electrode 10 of some embodiments, the first separator sheet 40 and the second separator sheet 50 are disposed on the further outer peripheral side relative to the outermost peripheral part (the part disposed on the outermost side in the radial direction of the spiral) 30d of the negative electrode sheet 30, in the third region 73. Accordingly, as illustrated in FIG. 8, the spirally-wound electrode 10 of some embodiments does not have the fifth region 205 (see FIG. 19) that is formed by lengthening one of two separator sheets, unlike the electrode in the related art. Thus, it is possible to shorten the first separator sheet 40 and the second separator sheet 50. Note that FIG. 8 is a perspective view of a stacked body 80, in which the spirally-wound electrode 10 of some embodiments is unfolded in a belt shape. As illustrated in FIG. 8, the first region 71, the second region 72, the third region 73, and the fourth region 74 are arranged in the stated order from a starting end 80a-side (a starting end side of the sheet) of the stacked body 80 to a trailing end 80b-side (a trailing end side of the sheet).

Further, in the first region 71, the position of the short side 43 of the first separator sheet 40 on the starting end 40a-side is aligned with the position of the short side 53 of the second separator sheet 50 on the starting end 50a-side. With this configuration, the lengths of the first separator sheet 40 and the second separator sheet 50 can be made uniform, and thus, the first separator sheet 40 and the second separator sheet 50 can be shortened more reliably.

Further, in the spirally-wound electrode 10 of some embodiments, the two separator sheets are consecutively stacked on the further outer peripheral side relative to the outermost peripheral part 30d of the negative electrode sheet 30, thereby making it possible to restrain the negative electrode sheet 30 from being exposed to the outside. This makes it possible to maintain performance of the spirally-wound electrode 10.

Further, as illustrated in FIG. 2, in the second region 72, the negative electrode sheet 30, the first separator sheet 40, the positive electrode sheet 20, and the second separator sheet 50 are arranged in the stated order from the inner side toward the outer side in the radial direction of the spiral, and the negative electrode sheet 30 is disposed on the inner peripheral side relative to the positive electrode sheet 20. Further, the short side 34 of the negative electrode sheet 30 on the starting end 30a-side and the short side 24 of the positive electrode sheet 20 on the starting end 20a-side are aligned at the positions in the same phase in the circumferential direction of the spiral. Accordingly, an innermost peripheral part 30b of the negative electrode sheet 30 is further disposed on the inner peripheral side relative to an innermost peripheral part 20b of the positive electrode sheet 20. Therefore, it is possible to avoid a situation where inner peripheral sides of the innermost peripheral parts 20b of the positive electrode sheet 20 face each other. Accordingly, for example, it is possible to prevent lithium from precipitating on a surface of the positive electrode sheet 20 on the inner peripheral side. This makes it possible to maintain performance of the spirally-wound electrode 10.

Further, as illustrated in FIG. 7, the fourth region 74 is disposed on an opposite side of the third region 73 from the second region 72 in the circumferential direction of the spiral. Further, as illustrated in FIG. 3, in the fourth region 74, the first separator sheet 40 and the second separator sheet 50 are arranged in the stated order from the inner side toward the outer side in the radial direction of the spiral. Further, in the fourth region 74, a short side 44 of the first separator sheet 40 on a trailing end 40b-side and a short side 54 of the second separator sheet 50 on a trailing end 50b-side are aligned at positions in the same phase in the circumferential direction of the spiral.

With this configuration, the lengths of the first separator sheet 40 and the second separator sheet 50 can be made uniform, and thus, the first separator sheet 40 and the second separator sheet 50 can be shortened more reliably.

Figure 10:
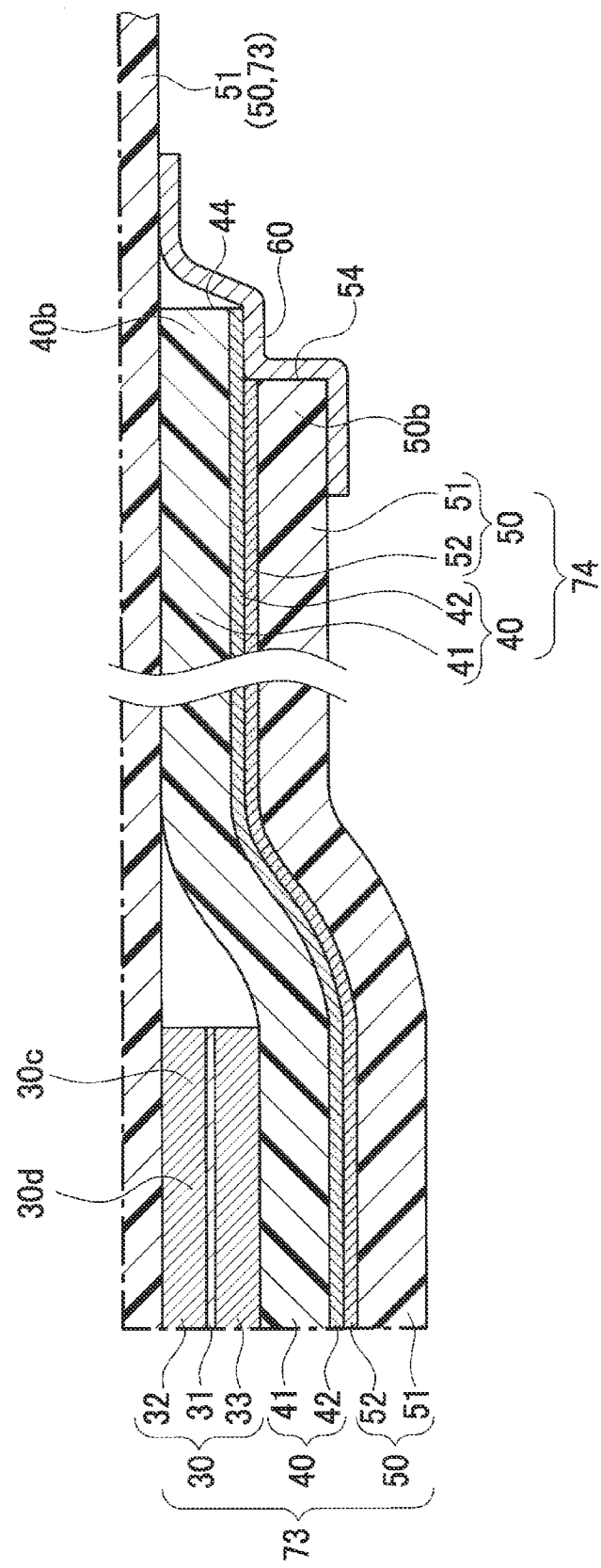
FIG. 10 is a view illustrating an example in which a trailing end of the first separator sheet, a trailing end of the second separator sheet, and the second separator sheet in the third region are fastened by an adhesive tape.

Note that, as illustrated in FIG. 10, in the circumferential direction (a right-left direction in FIG. 10) of the spiral, the short side 44 of the first separator sheet 40 on the trailing end 40b-side may be disposed at a position in a phase displaced toward a side opposite to the central side of the spiral relative to the short side 54 of the second separator sheet 50 on the trailing end 50*b*-side. Then, the short side 44 of the first separator sheet 40 on the trailing end 40*b*-side, the short side 54 of the second separator sheet 50 on the trailing end 50*b*-side, and the second separator sheet 50 in the third region 73 may be fastened by an adhesive tape 60. Thus, even when charging and discharging is repeated in a battery including the spirally-wound electrode 10 and the spirally-wound electrode 10 expands and shrinks, it is possible to maintain quality of the battery because the first separator sheet 40 and the second separator sheet 50 can hardly expand and shrink. The above description has dealt with a structure of the spirally-wound electrode 10 of some embodiments.

Next will be described a configuration of an electrode manufacturing apparatus 90 as one example of a manufacturing apparatus for a spirally-wound electrode, according to some embodiments.

Figure 11:
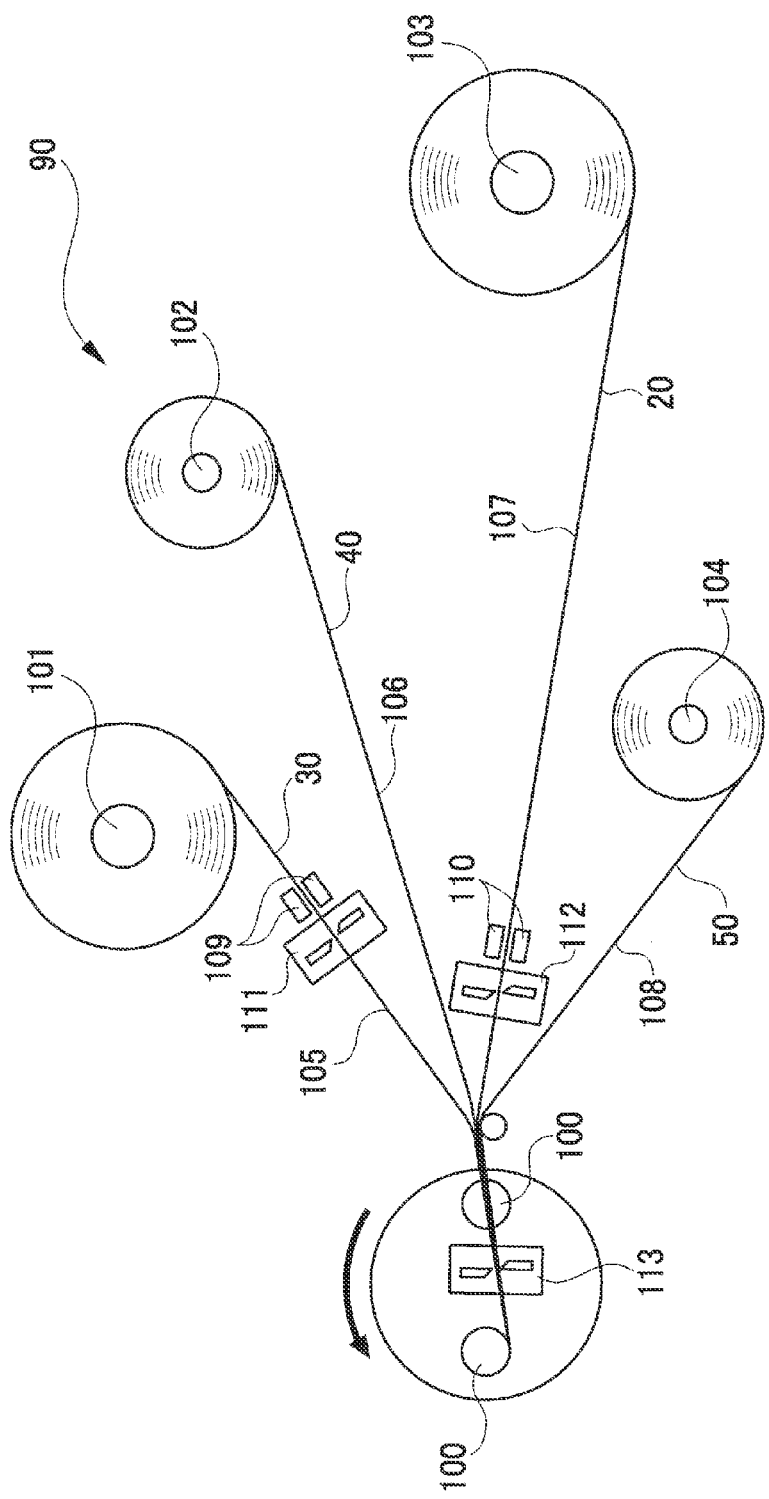
FIG. 11 is a schematic configuration diagram of an electrode manufacturing apparatus.
Figure 12:
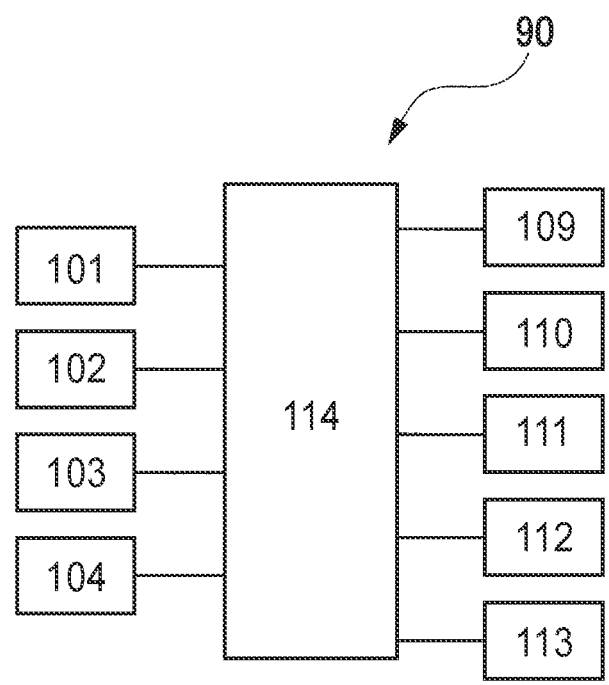
FIG. 12 is a schematic configuration diagram for illustrating a control unit.

As illustrated in FIGS. 11, 12, the electrode manufacturing apparatus 90 includes winding rollers 100, a negative electrode unwinding shaft 101, a first separator unwinding shaft 102, a positive electrode unwinding shaft 103, a second separator unwinding shaft 104, a negative electrode supply passage 105, a first separator supply passage 106, a positive electrode supply passage 107, a second separator supply passage 108, a negative electrode chuck 109, a positive electrode chuck 110, a negative electrode cutter 111, a positive electrode cutter 112, a separator cutter 113, a control unit 114, and the like.

The winding roller 100 is a device configured to wind sheets. In an example illustrated in FIG. 11, the two winding rollers 100 are provided, but the number of the winding rollers 100 is not limited in particular, and three winding rollers 100 may be provided.

The negative electrode unwinding shaft 101 is a shaft configured to unwind the negative electrode sheet 30. The first separator unwinding shaft 102 is a shaft configured to unwind the first separator sheet 40. The positive electrode unwinding shaft 103 is a shaft configured to unwind the positive electrode sheet 20. The second separator unwinding shaft 104 is a shaft configured to unwind the second separator sheet 50.

The negative electrode supply passage 105 is a passage on which the negative electrode sheet 30 is conveyed when the negative electrode sheet 30 is supplied to the winding roller 100. The first separator supply passage 106 is a passage on which the first separator sheet 40 is conveyed when the first separator sheet 40 is supplied to the winding roller 100. The positive electrode supply passage 107 is a passage on which the positive electrode sheet 20 is conveyed when the positive electrode sheet 20 is supplied to the winding roller 100. The second separator supply passage 108 is a passage on which the second separator sheet 50 is conveyed when the second separator sheet 50 is supplied to the winding roller 100. Note that, in each of the passages, the corresponding sheet is conveyed by a conveyance roller (not shown) and the like.

In some embodiments, the negative electrode supply passage 105, the first separator supply passage 106, the positive electrode supply passage 107, and the second separator supply passage 108 are disposed in the stated order with respect to the winding roller 100.

The negative electrode chuck 109 is a device configured to hold the negative electrode sheet 30 so as to convey the negative electrode sheet 30 on the negative electrode supply passage 105. The positive electrode chuck 110 is a device configured to hold the positive electrode sheet 20 so as to convey the positive electrode sheet 20 on the positive electrode supply passage 107.

The negative electrode cutter 111 is a device configured to cut the negative electrode sheet 30. The positive electrode cutter 112 is a device configured to cut the positive electrode sheet 20. The separator cutter 113 is a device configured to cut the first separator sheet 40 and the second separator sheet 50.

As illustrated in FIG. 12, the devices constituting the electrode manufacturing apparatus 90 are connected to the control unit 114, and the control unit 114 controls operations of the devices. The control unit 114 is constituted, for example, by a microcomputer, and includes a ROM that stores a control program, an input interface, an output interface, and the like.

The above description has dealt with the configuration of the electrode manufacturing apparatus 90.

Next will be described a method of manufacturing the spirally-wound electrode 10 with the use of the electrode manufacturing apparatus 90, as an operation of the electrode manufacturing apparatus 90.

Figure 13:
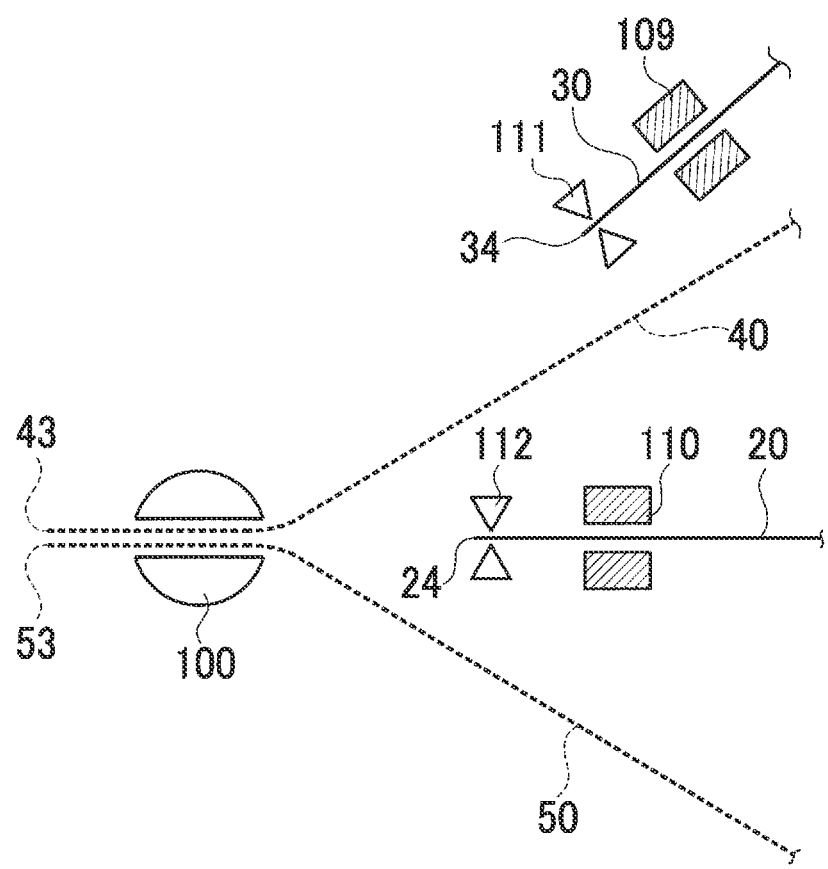
FIG. 13 is an explanatory view of a winding start step.

First, as illustrated in FIG. 13, the control unit 114 supplies the first separator sheet 40 and the second separator sheet 50 to the winding roller 100 while aligning the position of the short side 43 of the first separator sheet 40 on the starting end 40*a*-side (a winding start side) with the position of the short side 53 of the second separator sheet 50 on the starting end 50*a*-side (a winding start side) (a winding start control, a winding start step). At this time, the first separator sheet 40 is supplied to the winding roller 100 from the first separator unwinding shaft 102 via the first separator supply passage 106 (see FIG. 11). Further, similarly, the second separator sheet 50 is supplied to the winding roller 100 from the second separator unwinding shaft 104 via the second separator supply passage 108 (see FIG. 11).

Figure 14:
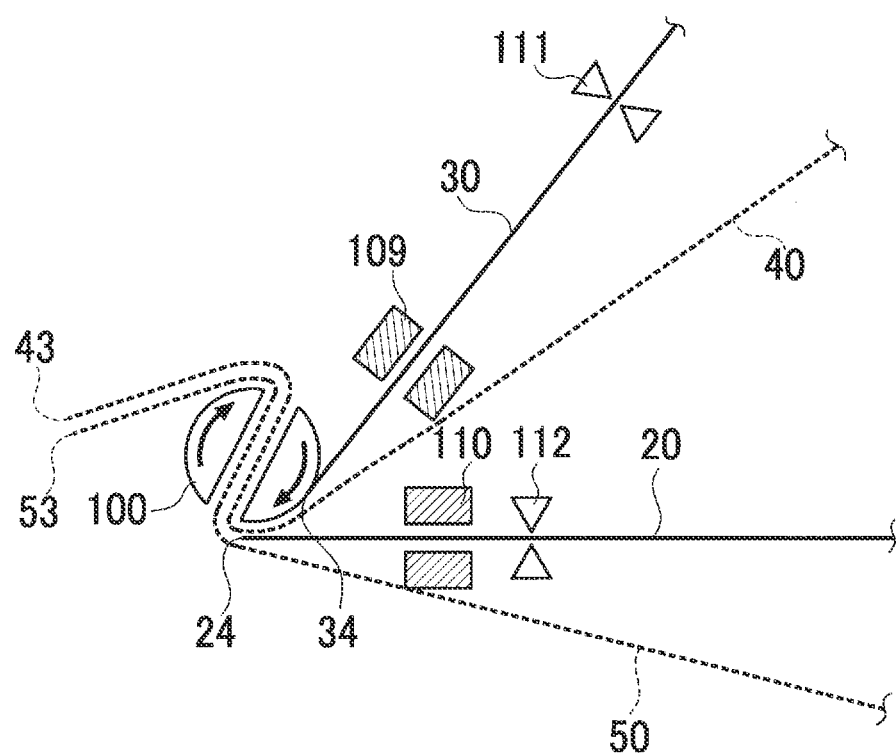
FIG. 14 is an explanatory view of a first winding step.

Subsequently, as illustrated in FIG. 14, the control unit 114 causes the winding roller 100 to circumferentially wind the first separator sheet 40 and the second separator sheet 50 with the first separator sheet 40 making direct contact with the second separator sheet 50 while aligning the position of the short side 43 of the first separator sheet 40 on the starting end 40*a*-side with the position of the short side 53 of the second separator sheet 50 on the starting end 50*a*-side (a first winding control). Thus, the first separator sheet 40 and the second separator sheet 50 are wound circumferentially with the first separator sheet 40 making direct contact with the second separator sheet 50 (a first winding step).

Figure 15:
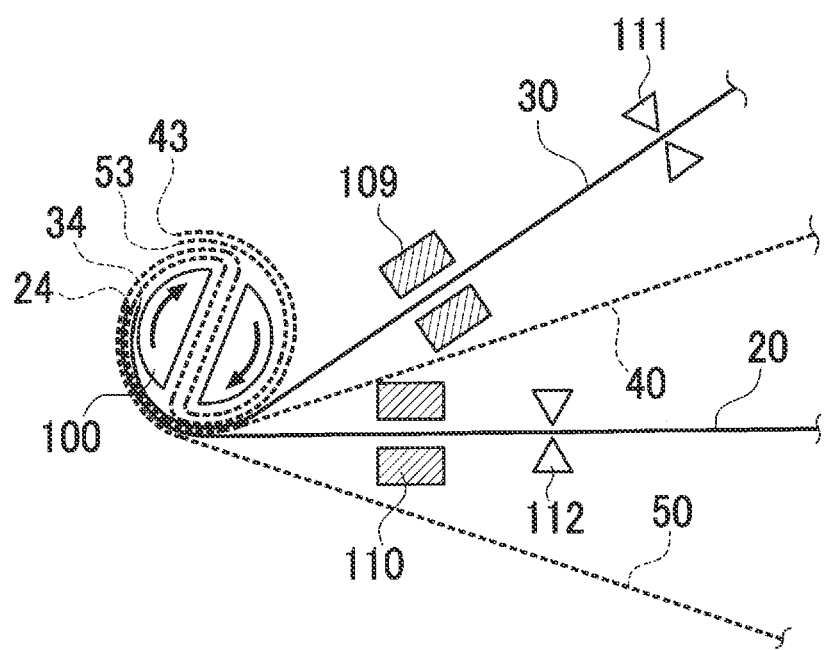
FIG. 15 is an explanatory view of a second winding step.

Then, the control unit 114 simultaneously supplies the short side 34 of the negative electrode sheet 30 on the starting end 30*a*-side and the short side 24 of the positive electrode sheet 20 on the starting end 20*a*-side to the winding roller 100, and as illustrated in FIG. 15, the control unit 114 causes the winding roller 100 to circumferentially wind the negative electrode sheet 30, the first separator sheet 40, the positive electrode sheet 20, and the second separator sheet 50. Then, the control unit 114 causes the winding roller 100 to wind the positive electrode sheet 20 up to the short side 25 thereof on the trailing end 20*c*-side (a second winding control).

At this time, the starting end 30*a* of the negative electrode sheet 30 held by the negative electrode chuck 109 is inserted between the winding roller 100 and the first separator sheet 40, and is supplied to the winding roller 100. Further, the starting end 20*a* of the positive electrode sheet 20 held by the positive electrode chuck 110 is inserted between the first separator sheet 40 and the second separator sheet 50, and is supplied to the winding roller 100. Further, the negative electrode sheet 30 is supplied to the winding roller 100 from the negative electrode unwinding shaft 101 via the negative electrode supply passage 105. Further, similarly, the positive electrode sheet 20 is supplied to the winding roller 100 from the positive electrode unwinding shaft 103 via the positive electrode supply passage 107.

Thus, the negative electrode sheet 30 is inserted on a winding center side (i.e., a side close to a winding center) relative to the first separator sheet 40 (i.e., the negative electrode sheet 30 is inserted such that the negative electrode sheet 30 is closer to the winding center than the first separator sheet 40), the positive electrode sheet 20 is inserted between the first separator sheet 40 and the second separator sheet 50 such that the positive electrode sheet 20 is on a side opposite to the winding center side relative to the first separator sheet 40 (i.e., the positive electrode sheet 20 is farther from the winding center than the first separator sheet 40), the negative electrode sheet 30, the first separator sheet 40, the positive electrode sheet 20, and the second separator sheet 50 are circumferentially wound, and the short side 25 of the positive electrode sheet 20 on the trailing end 20c-side is wound up (a second winding step). At this time, the short side 34 of the negative electrode sheet 30 on the starting end 30a-side and the short side 24 of the positive electrode sheet 20 on the starting end 20a-side are aligned at the positions in the same phase in a winding direction. Since the second winding step (the second winding control) is performed as described above, the negative electrode sheet 30, the first separator sheet 40, the positive electrode sheet 20, and the second separator sheet 50 are arranged in the stated order from the winding center side. In addition, the short side 34 of the negative electrode sheet 30 on the starting end 30a-side and the short side 24 of the positive electrode sheet 20 on the starting end 20a-side are aligned at the positions in the same phase in the winding direction. Thus, the negative electrode sheet 30 is further disposed on the inner peripheral side relative to the innermost peripheral part 20b of the positive electrode sheet 20. Therefore, it is possible to avoid the situation where inner peripheral sides of the innermost peripheral parts 20b of the positive electrode sheet 20 face each other.

Figure 16:
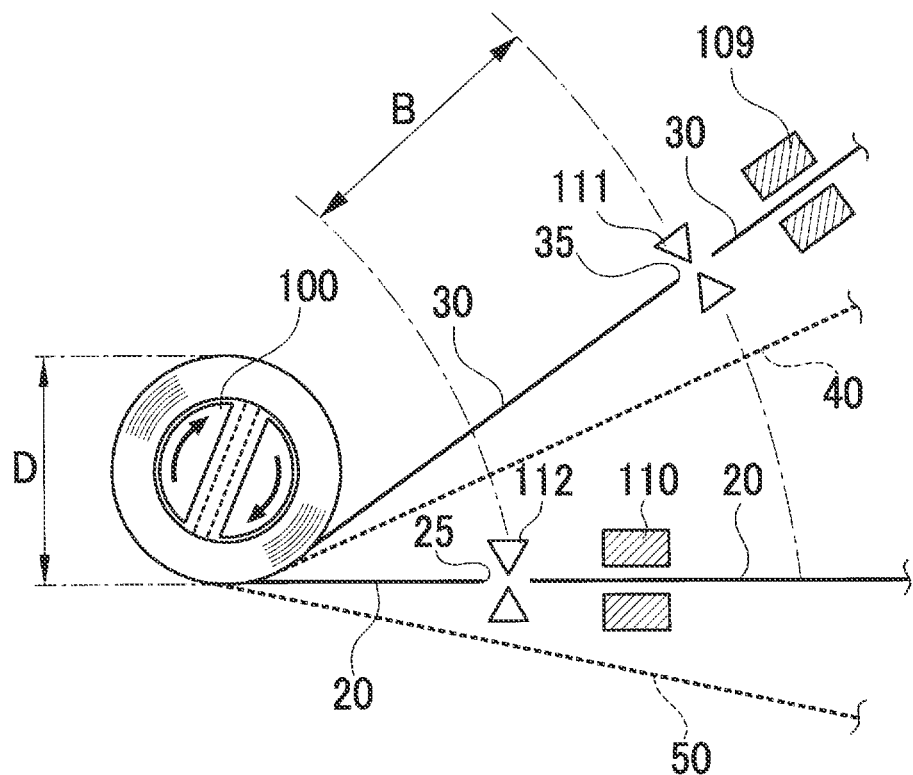
FIG. 16 is an explanatory view of an electrode cut step.

Further, as illustrated in FIG. 16, the control unit 114 causes the positive electrode cutter 112 to cut the positive electrode sheet 20, and causes the negative electrode cutter 111 to cut the negative electrode sheet 30 (an electrode cut control). Thus, as the electrode cut step, the positive electrode sheet 20 is cut (a positive electrode cut control, a positive electrode cut step), and the negative electrode sheet 30 is cut (a negative electrode cut control, a negative electrode cut step).

As illustrated in FIG. 16, a distance between the winding roller 100 and the negative electrode cutter 111 is larger than a distance between the winding roller 100 and the positive electrode cutter 112. In some embodiments, the negative electrode cutter 111 and the positive electrode cutter 112 are disposed so as to satisfy B>(π×D), where "B" is a difference between the distance between the winding roller 100 and the negative electrode cutter 111 and the distance between the winding roller 100 and the positive electrode cutter 112, and "D" is a diameter of a winding body at the time of cutting the positive electrode sheet 20 and the negative electrode sheet 30.

As a modified example, the positive electrode sheet 20 and the negative electrode sheet 30 may be cut at different timings, instead of cutting the positive electrode sheet 20 and the negative electrode sheet 30 at the same time. For example, the distance between the winding roller 100 and the negative electrode cutter 111 may be set to be equal to the distance between the winding roller 100 and the positive electrode cutter 112, and the positive electrode sheet 20 and the negative electrode sheet 30 may be cut at different timings. In this case, the negative electrode sheet 30 is cut at the time when the negative electrode sheet 30 passes the negative electrode cutter 111 by a length of "B" after the positive electrode sheet 20 is cut.

Figure 17:
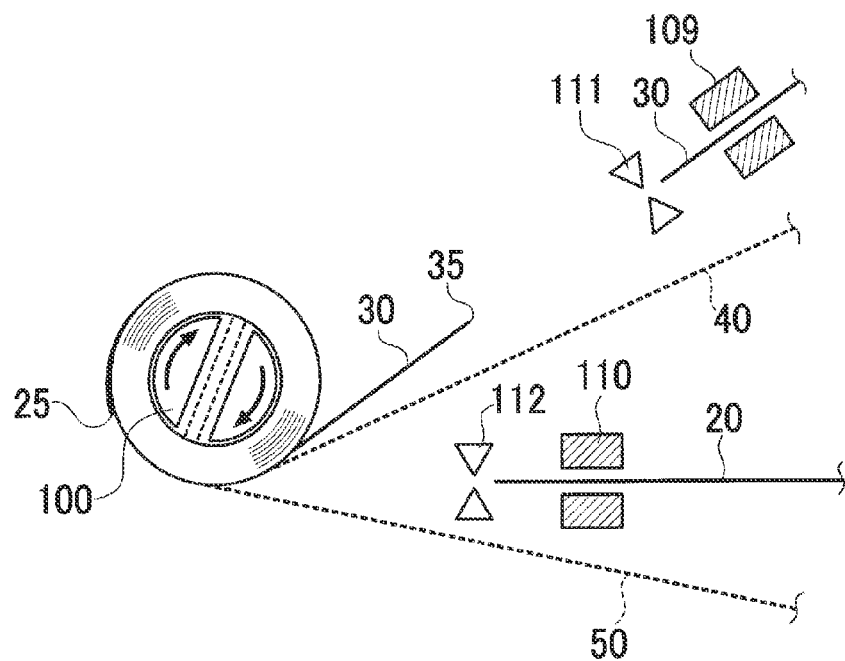
FIG. 17 is an explanatory view of a third winding step.

Subsequently, as illustrated in FIG. 17, the control unit 114 causes the winding roller 100 to circumferentially wind the negative electrode sheet 30, the first separator sheet 40, and the second separator sheet 50. Then, the control unit 114 causes the winding roller 100 to wind the negative electrode sheet 30 up to the short side 35 thereof on the trailing end 30c-side (a third winding control). Thus, in a state where the negative electrode sheet 30, the first separator sheet 40, and the second separator sheet 50 are arranged in the stated order from the winding center side, the negative electrode sheet 30, the first separator sheet 40, and the second separator sheet 50 are circumferentially wound up, and the short side 35 of the negative electrode sheet 30 on the trailing end 30c-side is wound up (a third winding step).

Thus, in some embodiments, the second winding step (the second winding control) is performed after the first winding step (the first winding control) is performed, and the third winding step (the third winding control) is performed after the second winding step (the second winding control) is performed.

Since the third winding step (the third winding control) is performed as described above, the negative electrode sheet 30, the first separator sheet 40, and the second separator sheet 50 are further arranged in the stated order from the winding center side. Thus, as illustrated in FIG. 3, the first separator sheet 40 and the second separator sheet 50 are disposed on the further outer peripheral side relative to the outermost peripheral part 30d of the negative electrode sheet 30 in the third region 73. Accordingly, unlike the conventional spirally-wound electrode, it is not necessary to lengthen one of two separator sheets, thereby making it possible to shorten the separator sheets. Further, as described above, since the first winding step (the first winding control) is performed, the position of the short side 43 of the first separator sheet 40 on the starting end 40a-side is aligned with the position of the short side 53 of the second separator sheet 50 on the starting end 50a-side, thereby making it possible to more reliably shorten the separator sheets. Accordingly, it is possible to shorten the separator sheets while maintaining the performance of the spirally-wound electrode 10.

Figure 18:
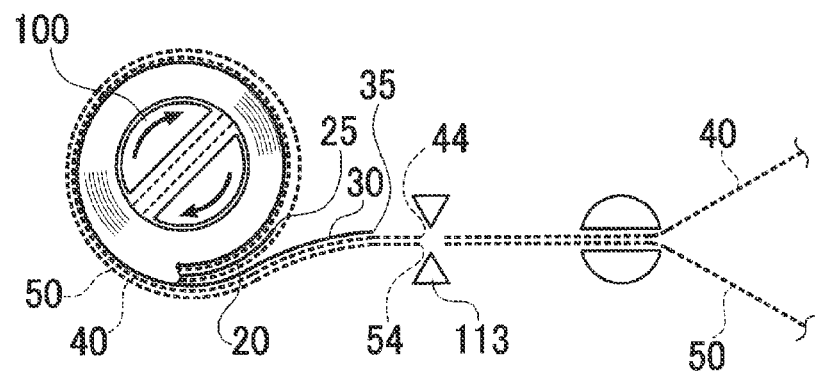
FIG. 18 is an explanatory view of a separator cut step.

Further, as illustrated in FIG. 18, the control unit 114 moves the winding roller 100 to a side opposite to the separator cutter 113, and causes the separator cutter 113 to cut the first separator sheet 40 and the second separator sheet 50 (a separator cut control). Thus, the first separator sheet 40 and the second separator sheet 50 are cut (a separator cut step).

More specifically, as illustrated in FIG. 18, the first separator sheet 40 and the second separator sheet 50 are cut by the separator cutter 113 at the same time. Thus, it is not necessary to cut the first separator sheet 40 and the second separator sheet 50 at different timings or at different places, thereby making it possible to reduce burden and cost in manufacturing of the spirally-wound electrode 10.

Further, by cutting the first separator sheet 40 and the second separator sheet 50 at the same place and at the same time, it is possible to displace the trailing end 40b of the first separator sheet 40 from the trailing end 50b of the second separator sheet 50 in the circumferential direction of the spiral due to a difference in circumferential length in the finished spirally-wound electrode 10, as illustrated in FIG. 10.

That is, by cutting the first separator sheet 40 and the second separator sheet 50 such that the lengths of the first separator sheet 40 and the second separator sheet 50 are equal to each other, the spirally-wound electrode 10 finished by winding the sheets is configured such that, in the circumferential direction of the spiral, the short side 44 of the first separator sheet 40 on the trailing end 40b-side is disposed at a position in a phase displaced toward a side opposite to the central side of the spiral relative to the short side 54 of the second separator sheet 50 on the trailing end 50b-side due to the difference in circumferential length. Consequently, as illustrated in FIG. 10, the short side 44 of the first separator sheet 40 on the trailing end 40b-side, the short side 54 of the second separator sheet 50 on the trailing end 50b-side, and the second separator sheet 50 in the third region 73 can be fastened by the adhesive tape 60. Thus, even if charging and discharging is repeated in a battery including the spirally-wound electrode 10 and the spirally-wound electrode 10 expands and shrinks, it is possible to maintain quality of the battery because the first separator sheet 40 and the second separator sheet 50 can hardly expand and shrink.

Subsequently, the control unit 114 causes the winding roller 100 to wind the trailing end 30c of the negative electrode sheet 30, and then, further causes the winding roller 100 to wind the trailing end 40b of the first separator sheet 40 and the trailing end 50b of the second separator sheet 50. Then, the control unit 114 causes the winding roller 100 to wind the first separator sheet 40 up to the short side 44 thereof on the trailing end 40b-side, and to wind the second separator sheet 50 up to the short side 54 on the trailing end 50b-side (a fourth winding control). Thus, after the third winding step is performed, the first separator sheet 40 and the second separator sheet 50 are wound circumferentially with the first separator sheet 40 making direct contact with the second separator sheet 50, and the short side 44 of the first separator sheet 40 on the trailing end 40b-side and the short side 54 of the second separator sheet 50 on the trailing end 50b-side are wound up (a fourth winding step).

Subsequently, the trailing end 50b of the second separator sheet 50 and the second separator sheet 50 on a previous lap are fastened by the adhesive tape 60. After that, the spirally-wound electrode 10 is deformed so as to have a flat outer shape (see FIGS. 1 to 3).

Thus, the spirally-wound electrode 10 is manufactured. The above description has dealt with the method of manufacturing the spirally-wound electrode 10 with the use of the electrode manufacturing apparatus 90.

Note that the above embodiments are merely exemplary, and do not limit the disclosure at all. Various modifications may be made to the above embodiments without departing from the scope of the disclosure. Note that the spirally-wound electrode 10 may have an outer shape other than the flat shape, e.g., a round shape.

What is claimed is:

1. A spirally-wound electrode comprising
   a sheet group in which a negative electrode sheet, a first separator sheet, a positive electrode sheet, and a second separator sheet are arranged, the sheet group being in a shape of a spiral, wherein:
   each of the negative electrode sheet, the first separator sheet, the positive electrode sheet, and the second separator sheet has a rectangular shape, and a long-side direction of each of the negative electrode sheet, the first separator sheet, the positive electrode sheet, and the second separator sheet extends along a circumferential direction of the spiral;
   a long side of the negative electrode sheet is longer than a long side of the positive electrode sheet, and a long side of the first separator sheet and a long side of the second separator sheet are longer than the long side of the negative electrode sheet;
   the spirally-wound electrode includes a first region, a second region, a third region, and a fourth region arranged in a stated order from a central side of the spiral in the circumferential direction of the spiral;
   the first region is a region where the first separator sheet makes direct contact with the second separator sheet and a position of a short side of the first separator sheet on an inner side of the spiral is aligned with a position of a short side of the second separator sheet on the inner side of the spiral;
   the second region is a region where the negative electrode sheet, the first separator sheet, the positive electrode sheet, and the second separator sheet are arranged in a stated order from an inner side toward an outer side in a radial direction of the spiral, and the second region extends, in the circumferential direction of the spiral, from a position where a short side of the negative electrode sheet on the inner side of the spiral and a short side of the positive electrode sheet on the inner side of the spiral are aligned with each other in a same phase to a position of a short side of the positive electrode sheet on an outer side of the spiral;
   the third region is a region where the negative electrode sheet, the first separator sheet, and the second separator sheet are arranged in a stated order from the inner side toward the outer side in the radial direction of the spiral, and the third region extends, in the circumferential direction of the spiral, from the position of the short side of the positive electrode sheet on the outer side of the spiral to a position of a short side of the negative electrode sheet on the outer side of the spiral; and
   the fourth region is a region where the first separator sheet makes direct contact with the second separator sheet.

2. The spirally-wound electrode according to claim 1, wherein:
   in the fourth region, the first separator sheet and the second separator sheet are arranged in a stated order from the inner side toward the outer side in the radial direction of the spiral; and
   in the fourth region, a short side of the first separator sheet on the outer side of the spiral and a short side of the second separator sheet on the outer side of the spiral are aligned at positions in a same phase.

3. The spirally-wound electrode according to claim 1, wherein:
   in the fourth region, the first separator sheet and the second separator sheet are arranged in a stated order from the inner side toward the outer side in the radial direction of the spiral;
   in the fourth region, a short side of the first separator sheet on the outer side of the spiral is disposed at a position in a phase displaced toward a side opposite to the central side of the spiral relative to a short side of the second separator sheet on the outer side of the spiral, in the circumferential direction of the spiral; and
   the short side of the first separator sheet on the outer side of the spiral, the short side of the second separator sheet on the outer side of the spiral, and the second separator sheet in the third region are fastened by an adhesive tape.

4. The spirally-wound electrode according to claim 1, wherein in the second region, a heat resistance layer of the first separator sheet faces a heat resistance layer of the second separator sheet such that the positive electrode sheet is disposed between the heat resistance layer of the first separator sheet and the heat resistance layer of the second separator sheet.

5. A method of manufacturing a spirally-wound electrode including a sheet group in which a negative electrode sheet, a first separator sheet, a positive electrode sheet, and a second separator sheet are arranged, the sheet group being in a shape of a spiral, wherein each of the negative electrode sheet, the first separator sheet, the positive electrode sheet, and the second separator sheet has a rectangular shape, and a long-side direction of each of the negative electrode sheet, the first separator sheet, the positive electrode sheet, and the second separator sheet extends along a circumferential direction of the spiral, the method comprising:

a first winding step of circumferentially winding the first separator sheet and the second separator sheet with the first separator sheet making direct contact with the second separator sheet;

a second winding step of, after the first winding step, circumferentially winding the negative electrode sheet, the first separator sheet, the positive electrode sheet, and the second separator sheet by inserting the negative electrode sheet on a winding center side relative to the first separator sheet and inserting the positive electrode sheet between the first separator sheet and the second separator sheet such that the positive electrode sheet is on a side opposite to the winding center side relative to the first separator sheet;

a third winding step of, after the second winding step, circumferentially winding the negative electrode sheet, the first separator sheet, and the second separator sheet in a state where the negative electrode sheet, the first separator sheet, and the second separator sheet are arranged in a stated order from the winding center side; and a fourth winding step of, after the third winding step, circumferentially winding the first separator sheet and the second separator sheet with the first separator sheet making direct contact with the second separator sheet, wherein:

a long side of the negative electrode sheet is longer than a long side of the positive electrode sheet, and a long side of the first separator sheet and a long side of the second separator sheet are longer than the long side of the negative electrode sheet;

in the first winding step, a position of a short side of the first separator sheet on a winding start side is aligned with a position of a short side of the second separator sheet on the winding start side;

in the second winding step, a short side of the negative electrode sheet on the winding start side and a short side of the positive electrode sheet on the winding start side are aligned at positions in a same phase in a winding direction, and a short side of the positive electrode sheet on a winding end side is wound up; and in the third winding step, a short side of the negative electrode sheet on the winding end side is wound up.

* * * * *